United States Patent [19]
Mizuno et al.

[11] Patent Number: 5,140,868
[45] Date of Patent: Aug. 25, 1992

[54] VISCOUS AND RUBBER-TYPE TORSIONAL DAMPER

[75] Inventors: Naohiko Mizuno, Toyota; Tamio Nakakubo, Nagoya; Akira Oguri, Toyota; Kazunori Aoki, Toyoake; Masayoshi Kadowaki, Toyota, all of Japan

[73] Assignees: Toyota Jidosha Kabushiki Kaisha, Toyota; Toyoda Koki Kabushiki Kaisha, Kariya, Japan

[21] Appl. No.: 559,279

[22] Filed: Jul. 27, 1990

[30] Foreign Application Priority Data

Jul. 31, 1989 [JP] Japan .................. 1-89253

[51] Int. Cl.⁵ .................................... F16F 15/10
[52] U.S. Cl. .......................... 74/574; 74/572
[58] Field of Search .................... 74/572–574

[56] References Cited

U.S. PATENT DOCUMENTS

| | | | |
|---|---|---|---|
| 3,812,724 | 5/1974 | Curtz et al. | 74/573 F |
| 4,002,086 | 1/1977 | Reinhall | 74/573 F |
| 4,134,309 | 1/1979 | Balke et al. | 74/573 F |
| 4,339,963 | 7/1982 | Bremer | 74/574 |
| 4,825,718 | 5/1989 | Seifert et al. | 74/574 |
| 4,873,887 | 10/1983 | Andra et al. | 74/574 |
| 4,892,174 | 1/1990 | Takekado | 74/573 F |
| 4,895,047 | 1/1990 | George | 74/573 F |

FOREIGN PATENT DOCUMENTS

| | | | |
|---|---|---|---|
| 2713332 | 10/1977 | Fed. Rep. of Germany | 74/573 F |
| 3545401 | 7/1987 | Fed. Rep. of Germany | 74/573 F |
| 0013078 | 2/1978 | Japan | 74/573 F |
| 55-60740 | 5/1980 | Japan | 74/573 F |
| 58-68531 | 4/1983 | Japan | 74/573 F |
| 696213 | 11/1979 | U.S.S.R. | 74/573 F |
| 1504998 | 3/1978 | United Kingdom | 74/573 F |

Primary Examiner—Vinh T. Luong
Attorney, Agent, or Firm—Cushman, Darby & Cushman

[57] ABSTRACT

A viscous and rubber-type torsional damper including a boss portion, a pulley portion, and connecting members for elastically connecting the boss portion and the pulley portion. The connecting portions are spaced from each other in an axial direction of the torsional damper and define a fluid-tight closed space therebetween. At least one protrusion is formed on at least one of the boss portion and the pulley portion. The protrusion protrudes into the closed space and a gap is formed between the surfaces of the protrusion and the surfaces opposing the protrusion. The area between the surfaces is filled with a viscous fluid such as a silicone oil. Due to this structure, the viscous damping ability of the damper is increased without increasing the radial size of the damper and without increasing the number of constructing members of the damper.

11 Claims, 4 Drawing Sheets

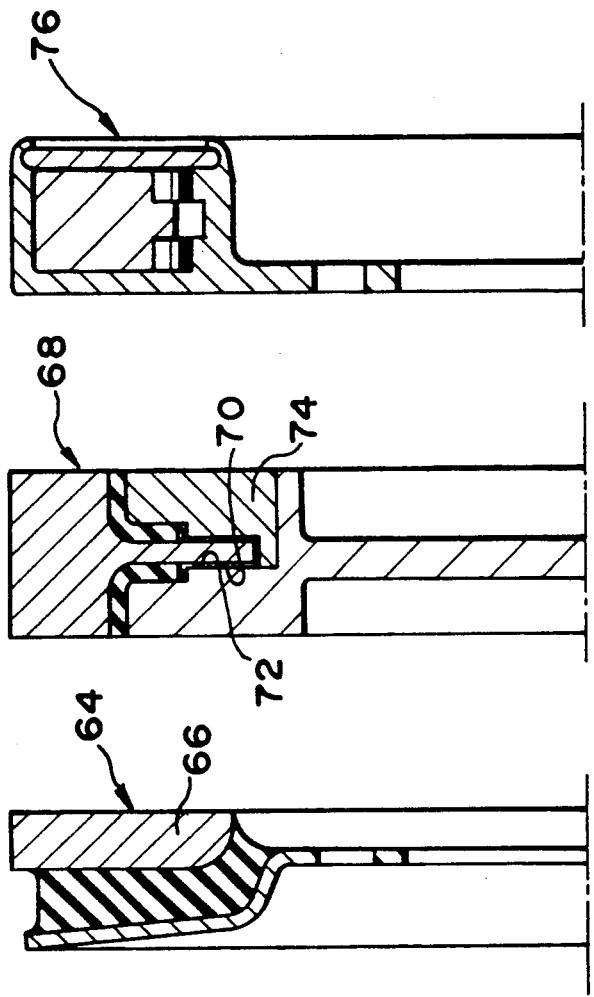

5,140,868

VISCOUS AND RUBBER-TYPE TORSIONAL DAMPER

BACKGROUND OF THE INVENTION

1. Field of the Invention

The present invention relates to a viscous and rubber-type torsional damper to dampen torsional oscillations or vibrations of rotary masses such as engine crankshafts or the like.

2. Description of the Prior Art

Conventional torsional dampers are generally classified into a rubber-type damper typical examples of which are shown in FIGS. 4 and 5, a viscous and rubber-type damper shown in FIG. 6, and a viscous-type damper shown in FIG. 7. Rubber-type dampers are further classified into a pulley-type damper shown in FIG. 4 and a disk-type damper shown in FIG. 5.

The pulley-type, rubber-type damper 60 of FIG. 4 has an advantage that the diametrical size of the damper is comparatively small as the pulley portion 62 is also used as a damping mass, but has the disadvantage that the damping ability is not great. The disk-type, rubber-type damper 64 of FIG. 5 has an advantage that the damper has a comparatively great damping ability because the inertial mass 66 is designed to be large, but has a disadvantage that the diametrical size of the damper is too great. The conventional viscous and rubber-type damper 68 of FIG. 6 has an advantage that the damping ability is great due to the rubber damping and the fluid viscous damping, but has disadvantages in that the diametrical size of the damper is too great, as it is in to the disk-type damper, since the radially extending surfaces 70 and 72 are used as working surfaces for generating a shear force in the viscous fluid and the number of the constructing members is increased because a seal member 74 needs to be provided. The viscous-type damper 76 of FIG. 7 has an advantage that the damping characteristic at high speeds is excellent, but has a disadvantage that the damping ability at low speeds is small.

SUMMARY OF THE INVENTION

An object of the invention is to provide a viscous and rubber-type torsional damper having an improved viscous damping ability of without an increase in the size of the damper or the number of the constructing members by comparison with a pulley-type, rubber-type damper.

The above-described object can be attained with a viscous and rubber-type torsional damper in accordance with the present invention. The torsional damper includes: an annular inner member adapted to be coupled to a rotational, vibratory mass to be damped; an annular outer member disposed radially outside and spaced from the inner member, the outer member constituting a main portion of a damping inertial mass; connecting members, each including a torsional spring constructed of an elastomer, for elastically connecting the inner and outer members, each of the connecting members being disposed radially between the inner and outer members and axially spaced from each other to define a fluid-tight closed space therebetween; at least one protrusion formed on at least one of the inner and outer members and radially protruding into the closed space to form gaps between the surfaces of the protrusion and the surfaces opposing the protrusion surfaces; and a viscous fluid filling the gap to generate a shear resistance when the protrusion surfaces and the protrusion opposing surfaces move relative to each other.

In the above-described torsional damper, since the outer member which operates as a pulley can also operate as a damping mass, the diametrical size of the damper is not increased in comparison with the prior art pulley-type, rubber-type damper. Further, since the axially extending surface of the protrusion has a sufficient axial length to generate a great viscous damping, the height of the protrusion can be small. As a result, the damper according to the invention, is more compact than the prior art viscous and rubber-type damper.

Further, since the connecting members operate as a torsional spring, as a seal member, and as a working surface for generating a viscous damping and since the protrusion is integrally formed on at least one of the inner and outer members, the number of constructing members is very small as compared with the prior art dampers.

BRIEF DESCRIPTION OF THE DRAWINGS

The above and other objects, features and advantages of the present invention will become more apparent and will be more readily appreciated from the following detailed description of the preferred exemplary embodiments of the invention taken in conjunction with the accompanying drawings, in which:

FIG. 4 is a half cross-sectional view of a conventional pulley-type, rubber-type damper;

FIG. 5 is a half cross-sectional view of a conventional disk-type, rubber-type damper;

FIG. 6 is a half cross-sectional view of a conventional viscous and rubber-type damper; and FIG. 7 is a half cross-sectional view of a conventional viscous-type damper.

DETAILED DESCRIPTION OF THE PREFERRED EMBODIMENTS

Figure 1:
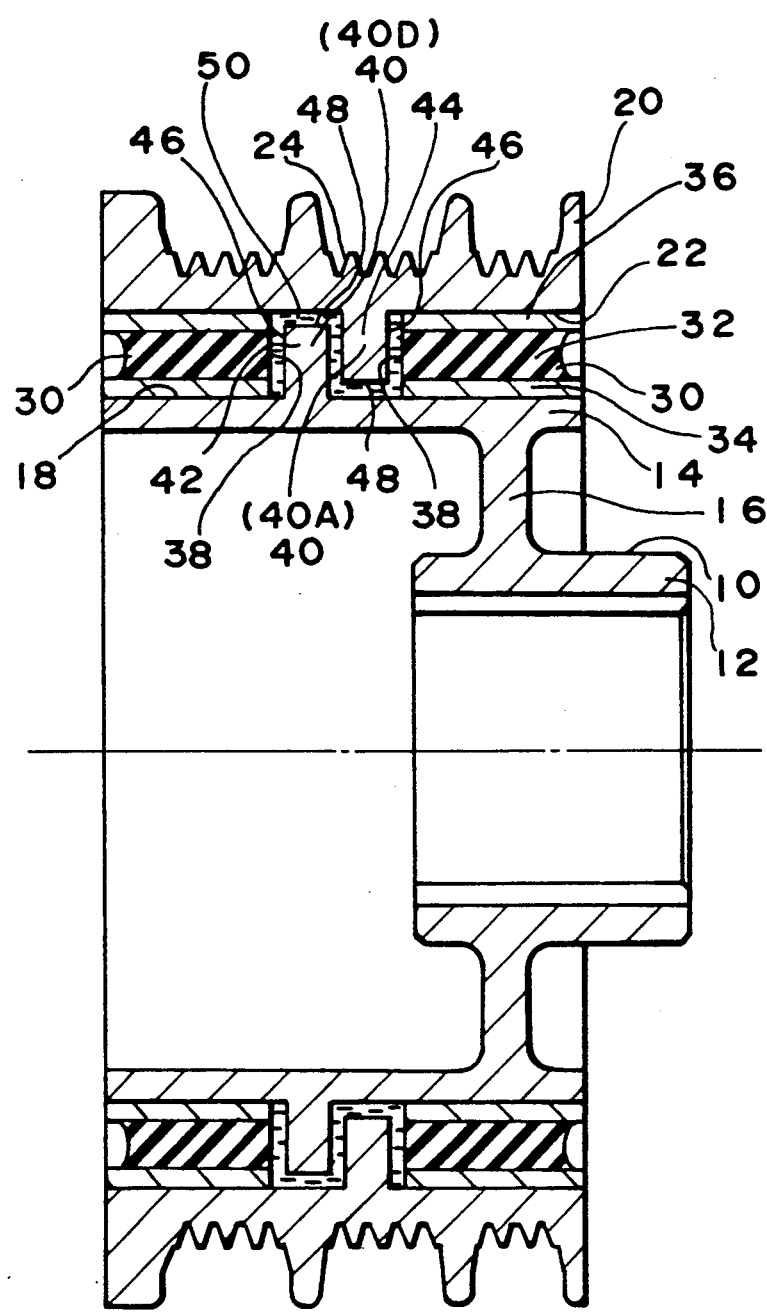
FIG. 1 is a cross-sectional view of a torsional damper in accordance with a first embodiment of the present invention.
Figure 2:
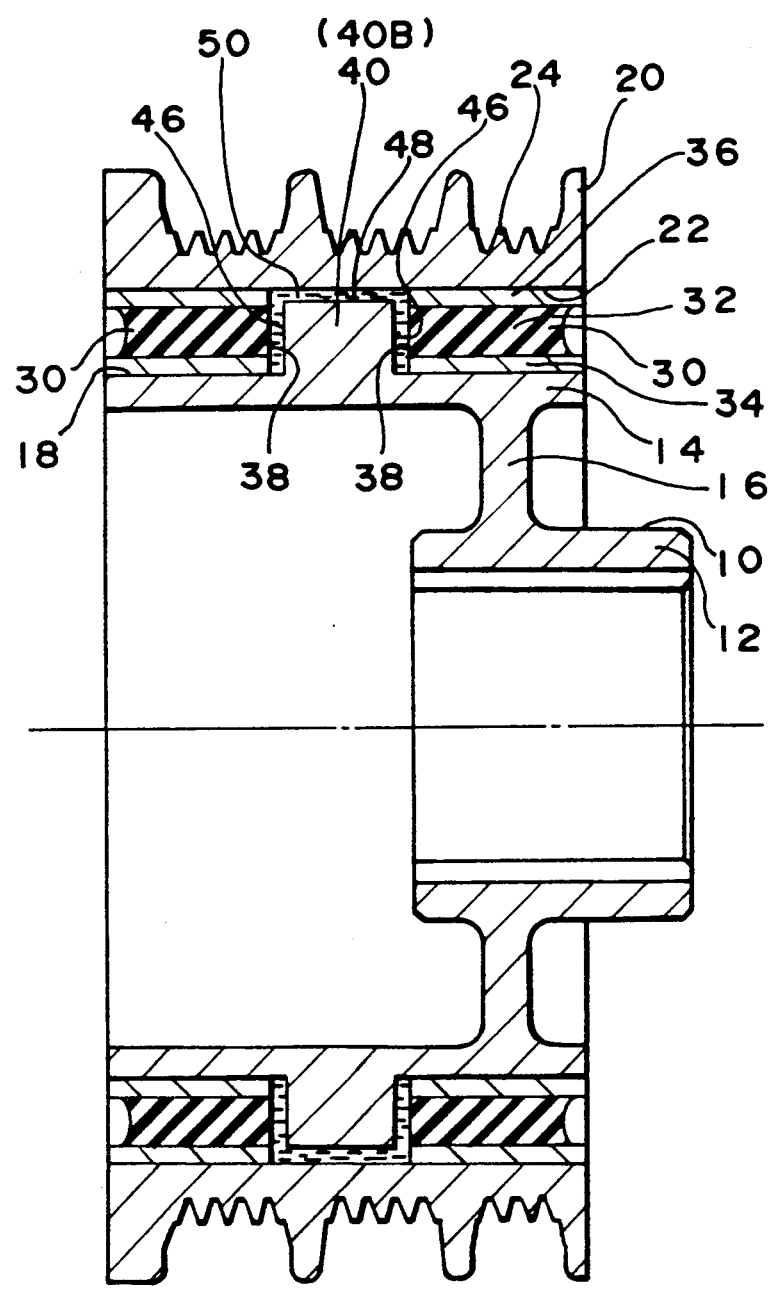
FIG. 2 is a cross-sectional view of a torsional damper in accordance with a second embodiment of the present invention.
Figure 3:
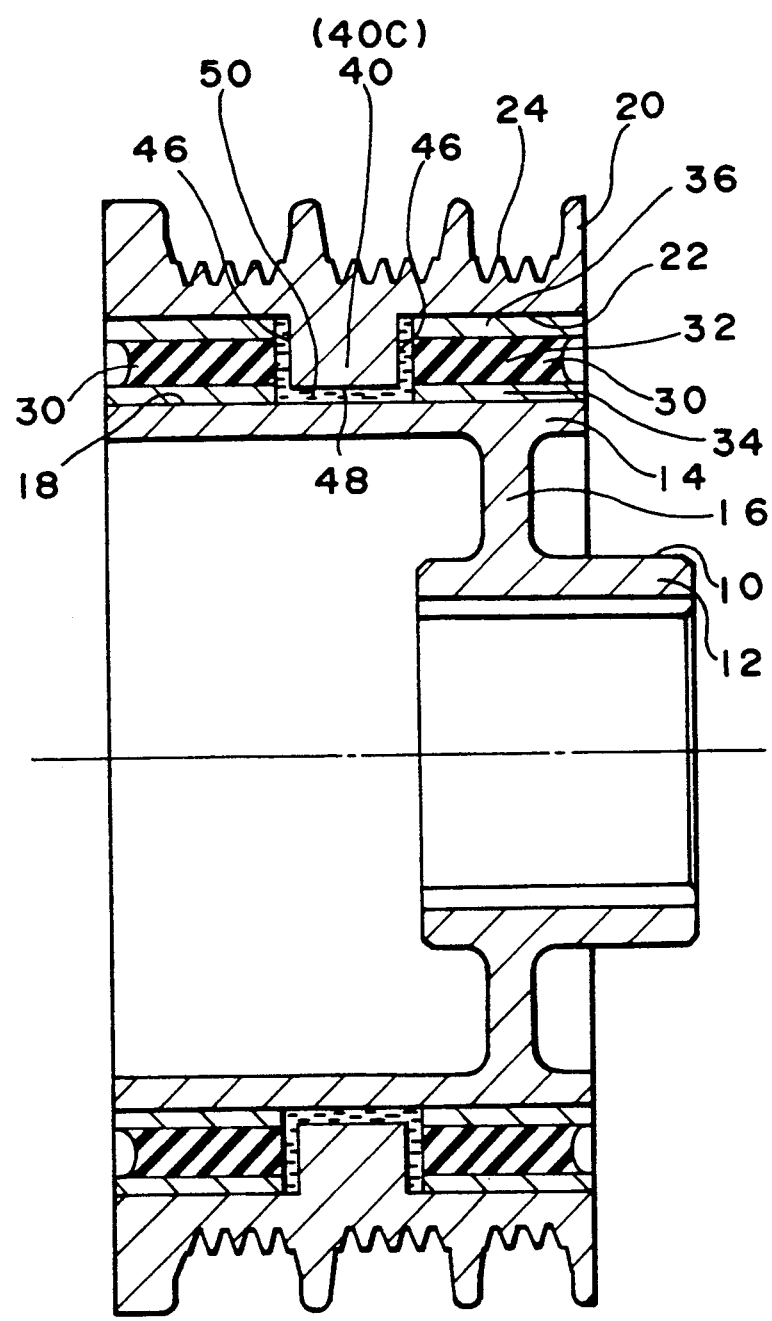
FIG. 3 is a cross-sectional view of a torsional damper in accordance with a third embodiment of the present invention.

FIGS. 1, 2, and 3 illustrate the first, second, and third embodiments of the invention, respectively. First, structures common with respect to all the embodiments will be explained with reference to, for example, FIG. 1.

A viscous and rubber-type torsional damper of the present invention generally includes an annular inner member 10 coupled to a rotational, vibratory mass to be damped, an annular outer member 20 disposed radially outside and spaced from inner member 10 and constituting a main portion of a damping inertial mass, connecting members 30, each including a torsional spring 32 constructed of an elastomer such as rubber, for elastically connecting the inner and outer members 10 and 20, at least one protrusion 40 formed on at least one of the inner and outer members 10 and 20, and a viscous fluid 50.

More particularly, the torsional damper is a damper pulley coupled to an engine crankshaft, where inner member 10 is a boss portion of the damper pulley and outer member 20 is a pulley portion having a great moment of inertia. Further, the vibratory mass to be damped is an engine crankshaft assembly.

Inner member 10 includes an inner cylindrical portion 12 having a key way where inner member 10 is coupled to the engine crankshaft so as to rotate together with the crankshaft, an outer cylindrical portion 14 disposed radially outside inner portion 12, and a radially extending portion 16 connecting the inner and outer portions 12 and 14. Outer portion 14 of inner member 10 has a cylindrical outer surface extending parallel to an axis of the torsional damper except protrusion 40. Outer portion 14 of inner member 10 has an axial length equal to an axial length of outer member 20.

Outer member 20 has at least one pulley groove 24 at an outer surface thereof where a belt (not shown) is wound. The belt transmits rotation of the crankshaft to at least one kind of auxiliary equipment such as a power generator. A damping inertial mass of the torsional damper is determined from the summation of the inertial mass of outer member 20 and inertial masses of outer retainers 36 described hereinafter. Since the inertial mass of outer member 20 is much greater than those of outer retainers 36, the damping mass of the torsional damper is mainly determined from the inertial mass of outer member 20. Outer member 20 has a cylindrical inner surface 22 extending parallel to the axis of the torsional damper except protrusion 40.

Two connecting portions 30 are provided. Each connecting portion 30 is interposed radially between the inner and outer members 10 and 20. The two connecting members 30 are spaced from each other in the axial direction of the torsional damper to define a closed space therebetween. Each connecting member 30 further includes an inner cylindrical metal retainer 34 and an outer cylindrical metal retainer 36 disposed radially outside and spaced from inner retainer 34. The elastomer 32 which is a cylindrical rubber member is inserted between the inner and outer retainers 34 and 36 and secured to the inner and outer retainers 34 and 36 through sulfuration. Each connecting member 30 is interference-fitted with the annular inner and outer members 10 and 20 so that the closed space formed between the two connecting members 30 is fluid-tight.

An axially inboard surface 38 of connecting member 30 is manufactured to be perpendicular to the axis of the torsional damper. This perpendicular configuration of the surface 38 is possible despite deformation of the rubber member 32 during sulfuration, because such a deformation of the rubber member 32 can be controlled by the inner and outer metal retainers 34 and 36. This radially straight extending inboard surface 38 enables the reduction of a thickness of a gap or clearance formed between the inboard surface 38 and a side surface of protrusion 40 opposing the inboard surface 38 and thereby increase a shear resistance of the viscous fluid 50 filled therebetween, that is, to increase a viscous damping of the torsional damper. In contrast, if the inboard surface were curved in an axially outboard direction, a thickness of the gap or clearance would partially increase and the viscous damping would be decreased.

As will be easily understood from the above-description, the two connecting members 30 perform three functions at the same time, that is, provide a torsional spring for the torsional damper, operate as seal members for sealing the closed space from the atmosphere, and operate as working surfaces for producing a viscous damping.

Protrusion 40 is formed on and integrally with at least one of the inner and outer members 10 and 20 and protrudes into the fluid-tight closed surface defined between the inboard surfaces 38 of the axially spaced connecting members 30 and between the internal surfaces of the inner and outer members 10 and 20. Protrusion 40 has a rectangular cross-section. Therefore, protrusion 40 has opposite side surfaces 46 and a cylindrical surface 48 connecting the opposite side surfaces 46. Each side surface 46 extends perpendicular to the axis of the torsional damper and the cylindrical surface 48 extends parallel to the axis of the torsional damper. Side surface 46 of protrusion 40 and inboard surface 38 of connecting member 30 extend in parallel with each other to form a gap or clearance therebetween which extends perpendicular to the axis of the torsional damper. Also, cylindrical surface 48 of protrusion 40 and cylindrical surface 18 and/or 22 of the inner and outer members 10 and/or 20 extend in parallel with each other to form a gap or clearance therebetween which extends parallel to the axis of the torsional damper.

The radially extending gap or clearance formed between the surfaces 46 and 38 has a substantially uniform thickness because the inboard surface 38 of connecting member 30 extends substantially straight. The radially extending gap or clearance formed between the surfaces 46 and 38 generates a shear force gradually increasing from a root to a tip of protrusion 40 when the inner and outer members 10 and 20 rotate relative to each other. The axially extending gap or clearance formed between the surface 48 and the surfaces 18 and/or 22 has a uniform thickness with an aimed dimension because the surface 48 and the surfaces 18 and/or 22 are machined surfaces of the annular members 10 and 20. The axially extending gap or clearance generates a shear force greater than that generated in the radially extending gap or clearance when the inner and outer members 10 and 20 rotate relative to each other. In order for a sufficient viscous damping to be obtained at the gap or clearance between the axially extending surfaces 48 and 18 and/or 22, the axial length of a single protrusion 40 or the summation of axial lengths of a plurality of protrusions 40 is selected to be greater than a radial length of the radially extending gap formed between the surfaces 46 and 38. This means that the viscous damping of the torsional damper of the present invention is determined not so much from the radially extending gap or clearance formed between the surfaces 46 and 38 as from the axially extending gap or clearance formed between the surfaces 48 and 18 and/or 22.

The gap between the surfaces 48 and 18 and/or 22 is designed to be thin to produce a sufficient shear resistance. For example, the protrusion 40 is designed to have a height substantially equal to a summation of the thickness of the elastomer 32 and the thickness of one of the inner and outer retainers 34 or 36 so that a gap has a thickness equal to a thickness of the retainer 34 or 36.

The viscous fluid 50 is, for example, a silicone oil. The silicone oil 50 forms a thin liquid film and generates a shear resistance when the inner and outer members 10 and 20 rotate relative to each other.

Next, structures specific to each embodiment will be explained.

FIG. 1 illustrates the first embodiment of the present invention. In the first embodiment, two protrusions 40A and 40D (suffix A will be attached to the protrusion 40 of the torsional damper of the first embodiment) are provided. One of the two protrusions 42 is integrally formed on the outer surface 18 of inner member 10 and the other of the two protrusions 44 is integrally formed on the inner surface 22 of outer member 20. The two protrusions 42 and 44 are arranged adjacent to each other in the axial direction of the torsional damper so as to form a radially extending gap or clearance therebetween. The radially extending gap or clearance defined between the two protrusions 42 and 44 generates a great viscous damping like the axially extending gap or clearance because the protrusion surfaces defining the radially extending gap or clearance therebetween move relative to each other as much as the surfaces of the tip portions of protrusions 40A and 40D move relative to the opposite surfaces of the inner and outer members 10 and 20. Therefore, the viscous damping of the torsional damper with the two protrusions is increased to a great extent in comparison with that of a torsional damper with a single protrusion. The greater the number of the protrusions, the greater the viscous damping of the damper is. However, the damper cannot be manufactured with three or more protrusions because assembly of the damper with three or more protrusions is impossible.

FIG. 2 illustrates the second embodiment of the present invention. In the second embodiment, a single protrusion 40B (suffix B will be attached to the protrusion 40 of the torsional damper of the second embodiment) is provided. The protrusion 40B is integrally formed on outer surface 18 of inner member 10. Since the axially extending gap or clearance which generates a greater viscous damping than the radially extending gap or clearance is located at a radially outermost portion of the protrusion 40B, the axially extending gap or clearance is necessarily filled with the viscous fluid 50 due to a centrifugal force acting on the fluid 50 during rotation of the damper. This assures a reliable viscous damping, even if a small amount of gas were included within the closed space due to some error in manufacture.

FIG. 3 illustrates the third embodiment of the present invention. In the third embodiment, a single protrusion 40C (suffix C will be attached to the protrusion 40 of the torsional damper of the third embodiment) is provided. The protrusion 40C is integrally formed on inner surface 22 of outer member 20. The damping inertial mass of the torsional damper of the third embodiment is increased by the amount of an inertial mass of the protrusion 40C. This increase in the inertial mass will increase the damping effect of the torsional damper, because the increased mass will absorb increased vibrational energy.

Next, common effects with respect to all the embodiments will be explained.

Generally, a viscous damping of a torsional damper is increased when the area of the working surface of generating a viscous damping is increased and the thickness of the gap or clearance defined between opposing working surfaces is decreased. In any embodiment of the present invention, the axially extending gap or clearance of the damper is longer than that of the prior art damper and the area of the working surfaces for generating a viscous damping is increased in the axial direction, thus the viscous damping is strengthened. Especially, in the first embodiment, the radially extending gap between the two protrusions 40A generates a damping as great as that of the axially extending gap, and the viscous damping is further increased. As a result, the viscous damping ability of the torsional damper of the present invention is increased without increasing the radial dimensions of the members of the pulley damper unlike the prior art damper which uses radial surfaces of metal members for generating a viscous damping and therefore is necessarily greater in the radial size. The increase in the axial dimension of the axial gap is not accompanied by an increase in an axial size of the pulley damper because the pulley damper has a sufficient axial length for providing pulley grooves which allows the increase of the axial dimension of the axially extending gap. As a result, the viscous damping ability of the torsional damper of the present invention can be increased without increasing the size of the damper.

Since the inboard surfaces 38 of connecting members 30 are manufactured to be straight in the direction perpendicular to the axis of the torsional damper, the radially extending gap between the surfaces 46 and 38 can be manufactured to have a thin gap with a uniform thickness. This thin gap with a uniform thickness helps to further increase the viscous damping ability of the torsional damper.

Since the connecting members 30 perform three functions, that is, provide a spring for the damper, seal the closed space, and provide the working surfaces for generating a shear force, the number of damper constructing members is smaller than a damper where specific members are provided for respective functions.

Although only a few embodiments of the present invention have been described in detail, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

We claim:

1. A viscous and rubber-type torsional damper comprising:
   an annular inner member;
   an annular outer member disposed radially outside and spaced from the inner member;
   connecting members, each including a torsional spring constructed of an elastomer, for elastically connecting the inner and outer members, each of the connecting members being disposed radially between the inner and outer members and axially spaced from each other to define a fluid-tight closed space therebetween, each of the connecting members having an axially inboard surface extending substantially perpendicular to an axis of the torsional damper;
   a first protrusion formed on the inner member and a second protrusion formed on the outer member, each of said first and second protrusions radially protruding into the closed space, whereby an annular gap is formed between a cylindrical surface of each protrusion and a cylindrical surface opposing each protrusion cylindrical surface, and whereby an inboard gap is formed between the inboard surface of each of the connecting members and an opposing side surface of both said first and second protrusions, each of said inboard gaps having a thin and substantially uniform thickness; and
   a viscous fluid filling each of the gaps formed to generate a shear resistance when the inner and outer members move relative to each other.

2. The torsional damper according to claim 1, wherein each of the connecting members further includes an inner cylindrical metal retainer and an outer cylindrical metal retainer disposed radially outside and spaced from the inner retainer, the elastomer being interposed between the inner and outer retainers and fixed to the inner and outer retainers through sulfuration, each of the connecting members being interference-fitted with the annular inner and outer members.

3. The torsional damper according to claim 2, wherein the outer member and the outer retainer constitute a damping inertial mass.

4. A viscous and rubber-type torsional damper comprising:
   an annular inner member;
   an annular outer member disposed radially outside and spaced from the inner member;
   connecting members, each including a torsional spring constructed of an elastomer, for elastically connecting the inner and outer members, each of the connecting members being disposed radially between the inner and outer members and axially spaced from each other to define a fluid-tight closed space therebetween, each of the connecting members including an inner cylindrical metal retainer and an outer cylindrical metal retainer disposed radially outside and spaced form the inner retainer, the elastomer being interposed between the inner and outer retainers and fixed to the inner and outer retainers through sulfuration, each of the connecting members being interference-fitted with the inner and outer members;
   at least one protrusion formed on at least one of the inner and outer members and radially protruding into the closed space, whereby a annular gap is formed between a cylindrical surface of the at least one protrusion and a cylindrical surface opposing the protrusion cylindrical surface, the protrusion being designed to have a height substantially equal to a summation of a thickness of the elastomer and a thickness of one of the inner and outer retainers; and
   a viscous fluid filling the gap to generate a shear resistance when the inner and outer members move relative to each other.

5. The torsional damper according to claim 1 or 4, wherein each protrusion side surface extends perpendicular to an axis of the torsional damper and each protrusion cylindrical surface extends parallel to the axis of the torsional damper so that each annular gap formed has a thin and substantially uniform thickness.

6. The torsional damper according to claim 4, wherein a single protrusion is provided and the protrusion is formed on the inner member.

7. The torsional damper according to claim 4, wherein a single protrusion is provided and the protrusion is formed on the outer member.

8. A viscous and rubber-type torsional damper comprising:
   an annular inner member;
   an annular outer member disposed radially outside and spaced from the inner member;
   connecting members, each including a torsional spring constructed of an elastomer, for elastically connecting the inner and outer members, each of the connecting members being disposed radially between the inner and outer members and axially spaced from each other to define a fluid-tight closed space therebetween;
   a first protrusion formed on the outer member, and a second protrusion formed on the inner member, the two protrusions radially protruding into the closed space to form annular gaps between surfaces of the protrusion and surfaces opposing the protrusion surfaces, said first and second protrusions being disposed adjacent each other in an axial direction of the torsional damper so as to provide a gap therebetween; and
   a viscous fluid filling the annular gaps and the gap between the first and second protrusions generating a shear resistance when the inner and outer members move relative to each other.

9. The torsional damper according to claim 89, wherein the first and second protrusions each have side surfaces extending perpendicular to an axis of the torsional damper and a cylindrical surface extending parallel to the axis of the torsional damper so that the annular gaps formed can be designed to have a thin and substantially uniform thickness.

10. The torsional damper according to any one of claims 1, 4, or 8, wherein the viscous fluid is a silicon oil.

11. The torsional damper according to any one of the claims 1, 4, or 8, wherein the torsional damper is a damper pulley, the inner member being a boss portion of the damper pulley and the outer member being a pulley portion of the damper pulley.

* * * * *